United States Patent Office 3,282,330
Patented Nov. 1, 1966

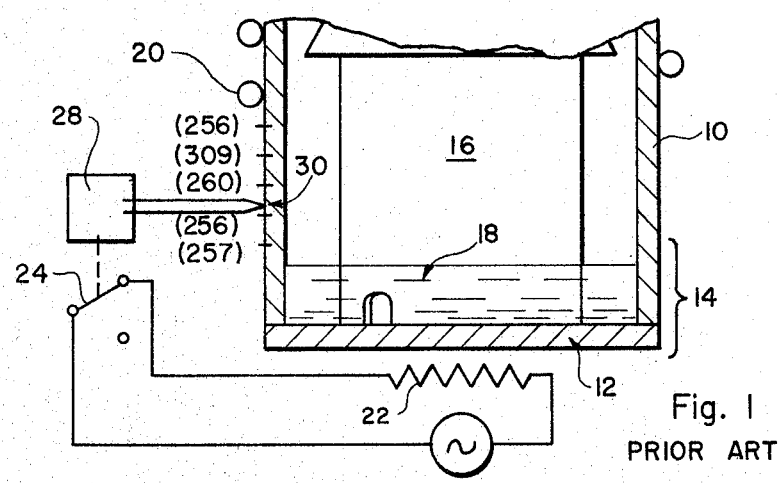
Fig. 1 PRIOR ART
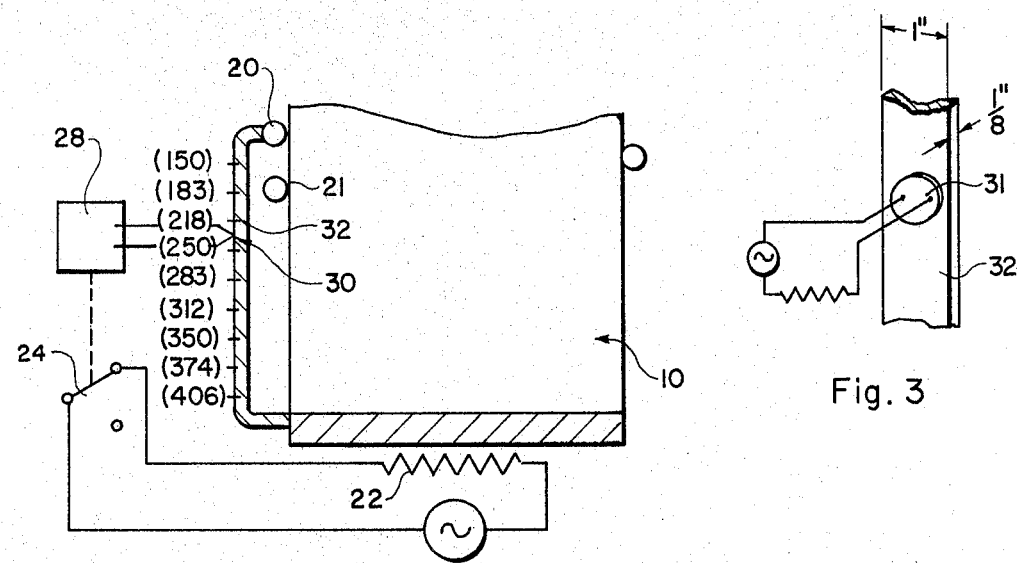
Fig. 2
Fig. 3

3,282,330
DIFFUSION PUMP SAFETY CONTROL
Arthur A. Landfors, Sharon, Mass., assignor to National Research Corporation, Cambridge, Mass., a corporation of Massachusetts
Filed Nov. 4, 1964, Ser. No. 408,945
1 Claim. (Cl. 165—11)

The present invention relates to vacuum diffusion pumps and more particularly to the control of heat input to the diffusion pump working fluid.

It is the object of the invention to provide an improved temperature responsive control for a diffusion pump.

I have discovered that the prior art methods of temperature control are not sensitive to all the principal modes of faulty operation of a diffusion pump. There are three possible modes: (1) failure of the wall cooling means, (2) accidental pressure rise in the pump while the boiler is operating, (3) loss of working fluid. Prior art temperature-responsive controllers consists of a thermostat measuring temperature of the boiler plate or of the diffusion pump wall. If the wall cooling means fails, the thermostat will sense a temperature rise beyond a preset limit and provide an output signal to an alarm or to cut off the pump heater. Reaction of the thermostat to the other modes of faulty operation (2) and (3), is less certain. For instance, if there is an accidental pressure rise (such as might occur through the operator's prematurely air releasing the pump), the boiling point of the working fluid will rise, thus allowing the heater to raise the temperature of the fluid excessively. The cooling system will try to compensate for this temperature rise and the thermostat may or may not respond to the faulty operation. Similarly, if the working fluid is lost, the counterbalanced operation of the heater and cooling means may deceive the thermostat.

My experiments show that temperatures between extremely hot and cold zones of the diffusion pump structure are erratic. It is often the case that there is not a progressively increasing temperature from the cold to hot zones.

Having discovered this anomaly and recognized its significance in diffusion pump operation, I have provided a simple solution to the problem. I connect the hot and cold zones with an elongated conductor which unfailingly provides a progressive temperature rise from the cold to hot zones and I apply temperature measurement along this conductor. When the temperature rises in the cold or hot zones due to any of the three modes of faulty operation described above, the temperature measured rises correspondingly.

The invention accordingly comprises an improved vacuum diffusion pump.

The invention will be readily understood by reference to the following specification and the accompanying drawings wherein:

FIG. 1 shows the lower end of a conventional diffusion pump; illustrating the difficulty of imposing realistic measurement of operating conditions;

FIG. 2 shows the lower end of the pump modified in accord with a preferred embodiment; and FIG. 3 shows a conductor bar used in the embodiment of FIG. 2.

A typical prior art diffusion pump is shown in FIG. 1. The pump comprises a vertically arranged tubular wall 10, a boiler plate 12 at the bottom of the tubular wall, defining with the wall, a boiler zone 14. A vapor jet assembly 16 is located centrally within the tubular wall for discharging vapor jets from nozzles against the wall. The vapor jets are formed by evaporating oil contained in a pool 18 in the boiler zone The wall is cooled by piping 20, in which water is circulated. As the oil vapor strikes the cooled wall, it is condensed and returned to the pool 18 for return to the interior of the vapor jet assembly.

The boiler zone is heated by a resistance heater element 22. The heater power circuit includes a switch 24 operated by a thermostat controller 28. The thermostat includes a sensing head 30 connected to wall of the diffusion pump.

The uncertainties inherent in such measurement were made clear by measurement of temperatures along the wall. I made temperature measurements along the wall of an operating pump at one-inch intervals. The readings are shown, for purposes of illustration, along the wall of the diffusion pump of FIG. 1. The readings are in degrees Fahrenheit. It is shown that the temperature at a point near the lowest cooling tube 20 is 256° F. The temperature one inch closer to the boiler is 309° F. and two inches closer to the boiler is 260° F.

To provide a more reliable arrangement, I modified the diffusion pump to produce the design of FIGS. 2–3. I connected the 1″ x ⅛″ copper bar at one end to the lowest cooling coil in which coolant is continuously circulated during pump operation. (Reference 21 indicates a coil in which coolant is only intermittently circulated.) The other end of the bar was connected to the boiler plate 12. I measured the temperature at one-inch intervals along the bar and obtained the readings (in degrees Fahrenheit) shown in parentheses along the bar. It will be recognized that the progression of temperatures with respect to distance is essentially linear.

The thermostat sensing head 30 can be placed at a location which normally runs at about 225° F. and the thermostat can be set to operate switch 24 when the temperature sensed rises above 300° F. This permits inexpensive and reliable thermostat operation. The thermostat 28, switch 24 and sensing head 30 can be consolidated in a simple bimetallic element contained in a disc 31, as shown in FIG. 3.

While a preferred embodiment has been described, it should be understood that variations can be practiced within the scope of the invention. For instance, elongated thermal conductors other than a copper bar can be used to connect the boiler zone and cooling means, e.g. using metals other than copper which have a thermal conductivity superior to that of the pump wall and using other forms of conductor such as rod, wires, etc. The cross section dimensions of the elongated conductor must be limited to avoid excessive heat loss from the boiler to cooling means. The invention can also be applied to pumps having coolants other than water. For instance, the bar 32 can be connected to the heat transfer fins normally found in pumps cooled by air or thermoelectricity.

What is claimed is:

In a diffusion pump comprising a vertically arranged tubular wall, a boiler means at the bottom of said pump for vaporizing a working fluid within the tubular wall, means for cooling the wall above the boiler means whereby a first heat transfer path is created along the tubular wall between the boiler means and the cooling means, and a temperature responsive means comprising a temperature responsive sensing element and signal output means responsive to said element to provide an output signal varying as a function of temperature sensed by the element, the improvement comprising elongated thermal conductor means, connecting the boiler and cooling means and arranged in parallel with the tubular wall structure to provide a second heat transfer path in parallel with the said first heat transfer path provided by the tubular wall structure between said boiler means and cooling means, the said temperature sensing element of said temperature responsive means being connected to said conductor means to detect temperature in a zone of the conductor means between its connections to the boiler and cooling means.

References Cited by the Examiner

FOREIGN PATENTS 1,331,467 5/1963 France.
1,046,250 12/1958 Germany.

ROBERT A. O'LEARY, *Primary Examiner.*

A. W. DAVIS, *Assistant Examiner.*